US009673005B2

(12) United States Patent
Urasaki et al.

(10) Patent No.: US 9,673,005 B2
(45) Date of Patent: Jun. 6, 2017

(54) SWITCHGEAR

(71) Applicant: Hitachi, Ltd., Chiyoda-ku, Tokyo (JP)

(72) Inventors: Hisashi Urasaki, Tokyo (JP); Makoto Hirose, Tokyo (JP); Masataka Sasaki, Tokyo (JP); Yoichi Oshita, Tokyo (JP); Yasuaki Aoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/029,464

(22) PCT Filed: Oct. 2, 2014

(86) PCT No.: PCT/JP2014/076437
§ 371 (c)(1),
(2) Date: Apr. 14, 2016

(87) PCT Pub. No.: WO2015/064296
PCT Pub. Date: May 7, 2015

(65) Prior Publication Data
US 2016/0268076 A1    Sep. 15, 2016

(30) Foreign Application Priority Data
Nov. 1, 2013 (JP) .................................. 2013-227915

(51) Int. Cl.
*H01H 33/36* (2006.01)
*H01H 33/59* (2006.01)
(Continued)

(52) U.S. Cl.
CPC ............ *H01H 33/36* (2013.01); *H01H 33/59* (2013.01); *H01H 33/88* (2013.01); *H02P 6/006* (2013.01);
(Continued)

(58) Field of Classification Search
CPC .. H01H 1/20; H01H 2071/0278; H01H 21/16; H01H 71/04; H01H 71/08;
(Continued)

(56) References Cited

U.S. PATENT DOCUMENTS 6,331,687 B1* 12/2001 Dunk .................. H01H 11/0062
218/140
2007/0139830 A1* 6/2007 Premerlani .............. H01H 9/40
361/2
(Continued)

FOREIGN PATENT DOCUMENTS

JP         6-331675 A    12/1994
JP        11-505366 A     5/1999
(Continued)

OTHER PUBLICATIONS

International Search Report (PCT/ISA/210) issued in PCT Application No. PCT/JP2014/076437 dated Dec. 22, 2014 with English-language translation (two (2) pages).
(Continued)

*Primary Examiner* — Truc Nguyen
(74) *Attorney, Agent, or Firm* — Crowell & Moring LLP

(57) ABSTRACT

The invention provides a switchgear that is capable of increasing a degree of freedom of a position of a moving arcing contact in a circuit breaker, does not require dimension management of components and a mechanism for adjusting a position of the moving arcing contact, and is capable of simplifying fabrication of components and assembly of devices and reducing cost. The switchgear according to the invention includes: a circuit breaker that is configured of a fixed arcing contact installed at a fixed-side conductor and a moving arcing contact installed at a moving electrode that opens and closes with respect to the fixed arcing contact; a linear motor that generates drive force for operating the moving arcing contact; a position detecting
(Continued)

device that detects a position of a moving element of the linear motor; a contact detecting device that detects a contact state between the fixed arcing contact and the moving arcing contact; and a control device that sets a moving range of the moving arcing contact by controlling a voltage and a phase to be supplied to the linear motor based on the contact state between the fixed arcing contact and the moving arcing contact, which is detected by the contact detecting device, and position information of the moving element of the linear motor, which is detected by the position detecting device.

14 Claims, 14 Drawing Sheets

(51) Int. Cl.
| | | |
|---|---|---|
| *H01H 33/88* | (2006.01) | |
| *H02P 6/00* | (2016.01) | |
| *H01H 9/16* | (2006.01) | |
| *H01H 47/02* | (2006.01) | |
| *H01H 3/26* | (2006.01) | |
| *H02K 41/02* | (2006.01) | |

(52) U.S. Cl.
CPC .............. *H01H 9/167* (2013.01); *H01H 47/02* (2013.01); *H01H 2003/268* (2013.01); *H02K 41/02* (2013.01)

(58) Field of Classification Search
CPC ...... H01H 71/125; H01H 83/10; H01H 83/12; H01H 85/0241; H01H 9/102; H01H 9/104; H01H 9/282; H01H 71/123; H01H 9/10; H01H 1/38
See application file for complete search history.

(56) References Cited

U.S. PATENT DOCUMENTS

| | | | | |
|---|---|---|---|---|
| 2007/0253124 | A1* | 11/2007 | Zhou | H01H 9/563 361/2 |
| 2012/0049995 | A1* | 3/2012 | Murray | H01H 75/06 337/2 |
| 2015/0091677 | A1 | 4/2015 | Urai et al. | |
| 2015/0131207 | A1* | 5/2015 | Urai | H01H 33/42 361/618 |
| 2016/0276120 | A1* | 9/2016 | Arcas | H01H 47/043 |

FOREIGN PATENT DOCUMENTS

| | | |
|---|---|---|
| JP | 2004-119310 A | 4/2004 |
| WO | WO 96/36982 A1 | 11/1996 |
| WO | WO 2013/150929 A1 | 10/2013 |

OTHER PUBLICATIONS

Japanese-language Written Opinion (PCT/ISA/237) issued in PCT Application No. PCT/JP2014/076437 dated Dec. 22, 2014 (four (4) pages).

\* cited by examiner

SWITCHGEAR

TECHNICAL FIELD

The present invention relates to a switchgear and particularly to a switchgear suitable for usage of a linear motor that electrically operates an actuator performing operations of opening and closing a circuit breaker, such as a gas circuit breaker, to interrupt a high voltage.

BACKGROUND ART

In recent years, there has been a pronounced tendency that such a gas-insulated switchgear, the entirety of which is significantly reduced in size by accommodating electric devices such as a current carrying conductor and a circuit breaker in a tank sealing sulfur hexafluoride ($SF_6$) gas with high insulation and interruption performances therein, is a mainstream technology of switchgears for electric power in response to an increase in demand for electric power and requirements for a small scale and high reliability of electric power equipment.

The most important component of the gas-insulated switchgear is a gas circuit breaker, and the gas circuit breaker has a structure in which the circuit breaker is supported in a sealing tank with $SF_6$ gas sealed therein via an insulating support.

The aforementioned circuit breaker is required to satisfy the duty of interrupting various currents as well as an ordinary load current, and the performances thereof are significantly affected by opening speeds of a moving arcing contact installed at a moving electrode of the circuit breaker and a fixed arcing contact installed at a fixed-side conductor.

In order to manage the opening speeds of the moving arcing contact and the fixed arcing contact, a managing method of performing assembly so as to set the moving amount of the moving arcing contact until the moving arcing contact and the fixed arcing contact open from the closing position (hereinafter, referred to as a wiped length) within a prescribed value is employed.

However, the aforementioned management method requires precise dimension management of the respective components and a mechanism for adjusting a position of the arcing contact after the assembly, and there is a problem that cost increases for fabrication of the components and the adjustment operation.

In a case of a puffer-type circuit breaker, remaining capacity in a puffer chamber at an opening position significantly affects a pressure rising property in the puffer chamber in the process of the opening operation. Therefore, it is necessary to manage the remained displacement in the puffer chamber at the opening position (hereinafter, referred to as an opened position clearance) at the same time.

For example, the current switchgear disclosed in PTL 1 is designed to perform the assembly such that the wipe and the clearance between arcing contacts are always within predetermined assembly tolerance by adjusting the wipe and the clearance between arcing contacts regardless of the length of a container in an axial direction.

CITATION LIST

Patent Literature

PTL 1: JP-A-2004-119310

SUMMARY OF INVENTION

Technical Problem

However, a gas circuit breaker in the related art requires management of a position of a moving arcing contact in the circuit breaker in order to secure high-speed fault current interrupting performance, which is the most important mission thereof, and strict management of component dimensions and an electrode position adjustment operation by an adjustment mechanism are performed for each device. Nevertheless, variations occur in the devices. The reason is because it is inevitable to perform management such that the wiped length is within a range of specific management values of about several mm in consideration of fabrication efficiency. That is, the method of managing the position of the moving arcing contact by the aforementioned component dimension management and the adjustment mechanism requires a long operation time, and it is difficult to eliminate the variations in the wiped length of the respective devices.

Although the adjustment mechanism for positioning is required between the fixed electrode and the fixed arcing contact so as to be able to adjust the position of the fixed arcing contact in the horizontal direction according to PTL 1, the adjustment mechanism for the positioning complicates the structure of the circuit breaker, which brings about an increase in cost and an increase in potential generated by metallic particles. Therefore, there is a problem that reliability of the device deteriorates.

The invention was made in view of the above circumstances, and an object thereof is to provide a switchgear that is capable of increasing a degree of freedom of a position of a moving arcing contact in a circuit breaker, does not require dimension management of components and a mechanism for adjusting a position of the moving arcing contact, which are required in the related art, and is capable of simplifying fabrication of components and assembly of devices and reducing cost.

Solution to Problem

In order to achieve the above object, a switchgear according to the invention includes a circuit breaker that is configured of a fixed arcing contact installed at a fixed-side conductor and a moving arcing contact installed at a moving electrode that opens and closes with respect to the fixed arcing contact; a linear motor that generates drive force for operating the moving arcing contact; a position detecting device that detects a position of a moving element of the linear motor; a contact detecting device that detects a contact state between the fixed arcing contact and the moving arcing contact; and a control device that sets a moving range of the moving arcing contact by controlling a voltage and/or a phase to be supplied to the linear motor based on the contact state between the fixed arcing contact and the moving arcing contact, which is detected by the contact detecting device, and position information of the moving element of the linear motor, which is detected by the position detecting device.

In order to achieve the above object, a switchgear of the invention includes: a circuit breaker that is configured of a fixed arcing contact installed at a fixed-side conductor and a moving arcing contact installed at a moving electrode that opens and closes with respect to the fixed arcing contact; a linear motor that generates drive force for operating the moving arcing contact; a position detecting device that detects a position of a moving element of the linear motor; a contact detecting device that detects a contact state between the fixed arcing contact and the moving arcing contact; and a control device that changes a magnitude and/or a direction of thrust force acting on the moving element of the linear motor by controlling a voltage and/or a phase to be supplied to the linear motor and that sets a moving range of the moving arcing contact by controlling a drive speed and a stop position of the moving arcing contact based on the contact state between the fixed arcing contact and the moving arcing contact, which is detected by the contact detecting device, and position information of the moving element of the linear motor, which is detected by the position detecting device.

Advantageous Effects of Invention

The invention has effects that the degree of freedom of the position of the moving arcing contact in the circuit breaker easily increases, that the dimension management of the components and the mechanism for adjusting the position of the moving arcing contact, which are required in the related art, are not required, and that simplification of component fabrication and device assembly and cost reduction can be achieved.

DESCRIPTION OF EMBODIMENTS

Figure 1:
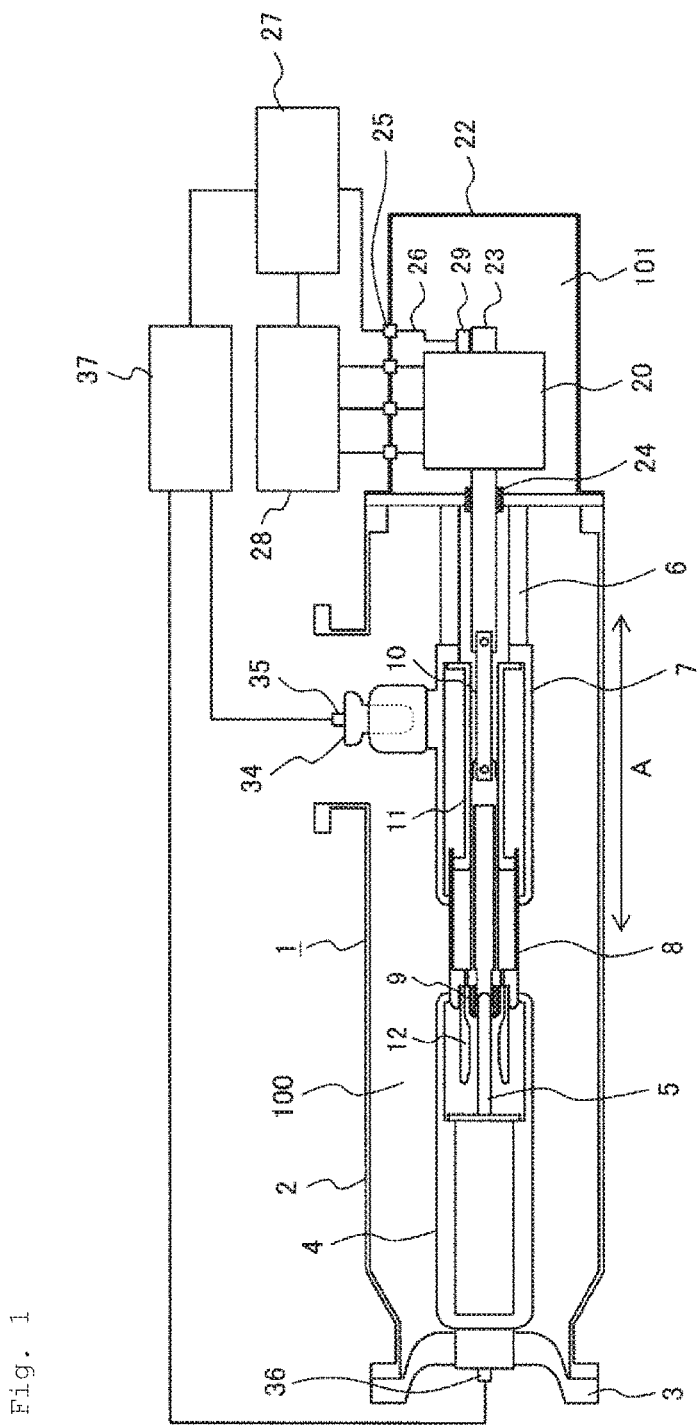
FIG. 1 is a sectional view illustrating a first embodiment of a switchgear according to the invention and illustrating a closing position in a gas circuit breaker.

Hereinafter, a description will be given of a switchgear of the invention based on embodiments illustrated in the drawings. The same reference numerals will be used for the same components in the respective embodiments.

First Embodiment

Figure 2:
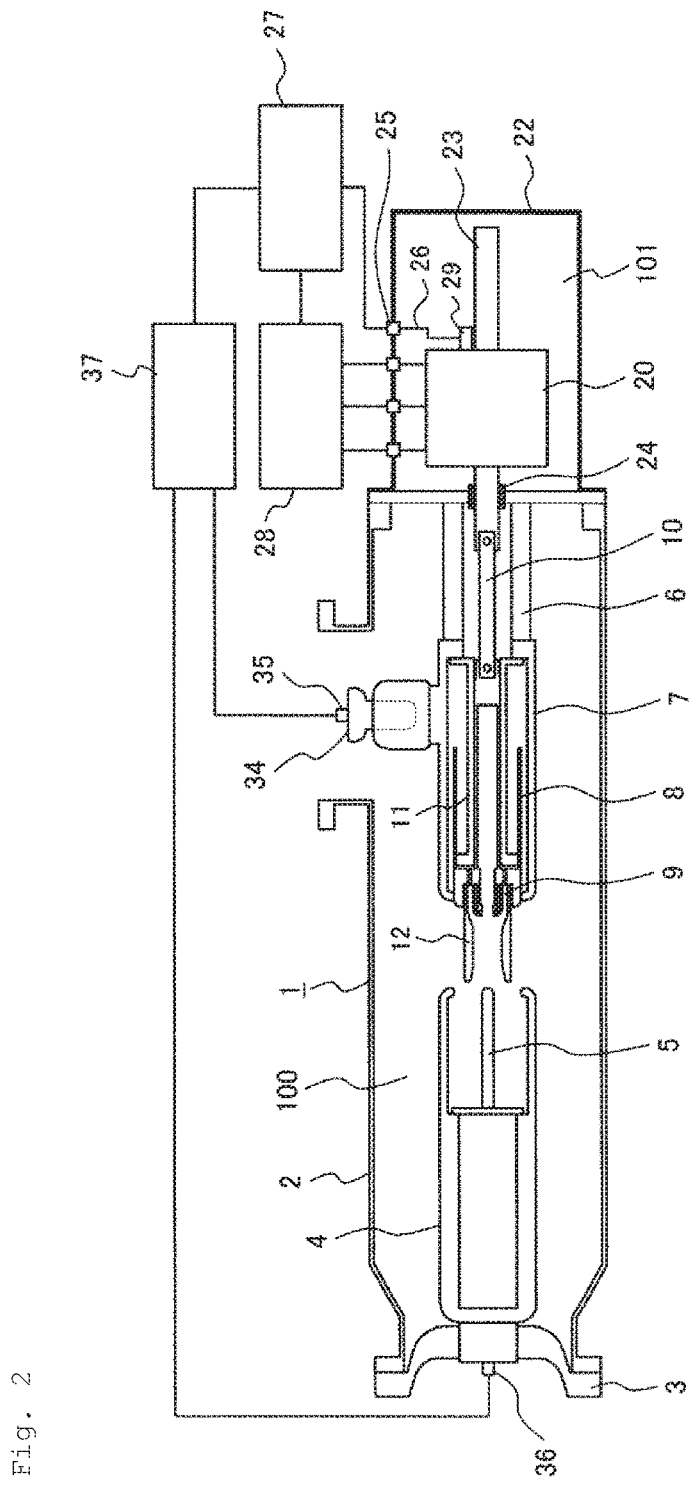
FIG. 2 is a sectional view illustrating the first embodiment of the switch gear according to the invention and illustrating an opening position of the gas circuit breaker.
Figure 3:
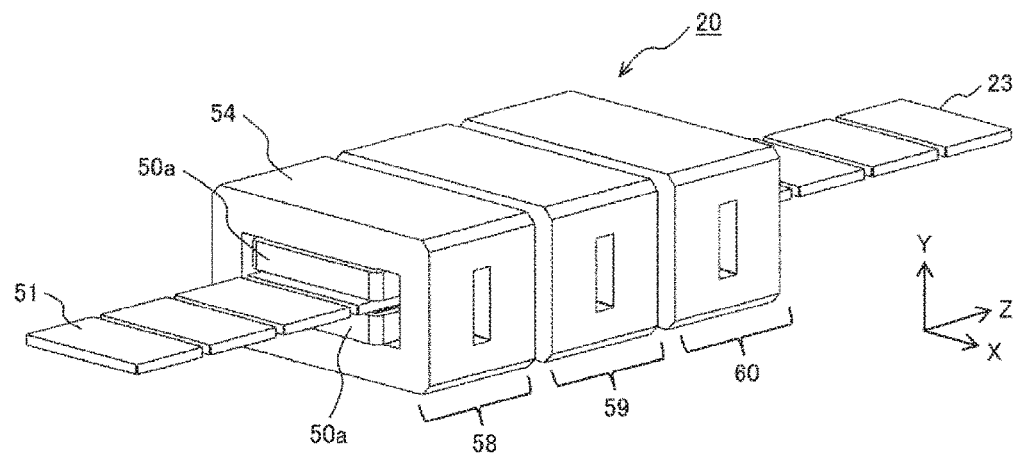
FIG. 3 is a perspective view illustrating a configuration of a linear motor that is employed in the gas circuit breaker according to the first embodiment of the switch gear of the invention.
Figure 4:
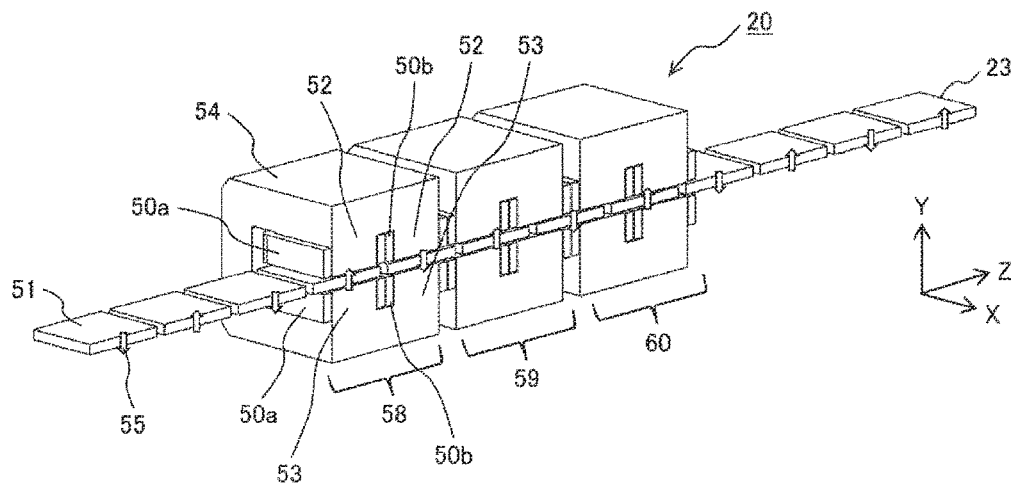
FIG. 4 is a sectional view illustrating a state in which the linear motor in FIG. 3 is cut along the plane Y-Z.

FIGS. 1 and 2 illustrate a gas circuit breaker according to a first embodiment of the switchgear of the invention, where FIG. 1 illustrates a closing position of the gas circuit breaker and FIG. 2 illustrates an opening position of the gas circuit breaker.

As illustrated in the drawings, the gas circuit breaker 1 according to the embodiment is roughly classified into a circuit breaker 100 for interrupting a fault current and an operation unit 101 for operating the circuit breaker 100.

The circuit breaker 100 is substantially configured of a fixed-side conductor 4 that is fixed to an insulating spacer 3 provided at an end of a tank 2, a fixed arcing contact 5 that is installed at the fixed-side conductor 4, a moving arcing contact 9 that is arranged so as to face the fixed arcing contact 5 and is brought into contact with (closes) or separated from (opens) the fixed arcing contact 5, a moving electrode 8 at which the moving arcing contact 9 is installed, a moving-side conductor 7 that supports the moving electrode 8 and is electrically connected thereto, a nozzle 12 that is provided at a tip end of the moving electrode 8 and blows arc extinguishing gas with a puffer piston 11 to an arc generated between the fixed arcing contact 5 and the moving arcing contact 9 when the fixed arcing contact 5 and the moving arcing contact 9 open or close to extinguish the arc, an insulating rod 10 that is connected to the side of the operation unit 101 and is also connected to the moving electrode 8, an insulating tube 6 that supports the moving-side conductor 7, and a main conductor (not shown) that is connected to the moving arcing contact 9 and forms a part of the main circuit, in the tank 2 with $SF_6$ gas sealed therein.

In addition, the circuit breaker 100 is designed such that input (close) and interruption (open) of a current are performed by moving the moving arcing contact 9 in the direction represented by the arrow A in the drawing (hereinafter, referred to as a direction A) through an operation force from the operation unit 101 and electrically opening and closing the moving arcing contact 9 with respect to the fixed arcing contact 5.

In contrast, the operation unit 101 is substantially configured of an actuator case 22 that is provided so as to be adjacent to the tank 2, a linear motor (actuator) 20 that is installed inside the actuator case 22, a moving element 23 that is arranged inside the linear motor 20 and linearly moves in the direction A inside the linear motor 20, a position detecting device 29 that is installed in the periphery of the moving element 23 and detects a position of the moving element 23, a conduction detecting device 37 that is a contact detecting device for detecting a contact state between the fixed arcing contact 5 and the moving arcing contact 9, a control unit 27 that controls a current and a phase to be supplied to the linear motor 20 based on the contact state between the fixed arcing contact 5 and the moving arcing contact 9, which is detected by the conduction detecting device 37, and position information of the moving element 23 of the linear motor 20, which is detected by the position detecting device 29, and a drive circuit 28 that receives a drive signal from the control unit 27 and supplies the same voltage as that indicated by the drive signal to the linear motor 20, and the control unit 27 and the drive circuit 28 form a control device.

In addition, the conduction detecting device 37 has a test conductor 34 attached to the moving-side conductor 7, includes a first conduction measurement terminal 35 that is provided at the test conductor 34 and a second conduction measurement terminal 36 that is provided on the side of the insulating spacer 3 of the fixed-side conductor 4, and detects timing at which the fixed arcing contact 5 and the moving arcing contact 9 are brought into contact with or separated from each other based on currents from the first conduction measurement terminal 35 and the second conduction measurement terminal 36.

In addition, the linear motor 20 can generate a magnetic field therein by using a voltage and a current supplied from the control unit 27 and the drive circuit 28 and cause linear motion of the moving element 23 arranged inside the linear motor 20 with electromagnetic force, and the position of the moving element 23 can be detected by the position detecting device 29.

In addition, the moving element 23 is connected to the insulating rod 10 of the circuit breaker 100 through a gas-seal unit 24 that is provided so as to be able to be driven while maintaining air sealing in the tank 2 (the gas-seal unit 24 allows the operation of the moving element 23 (movement in the direction A) and maintains the air sealing in the tank 2). That is, the insulating rod 10 is coupled to the moving electrode 8 and can cause the moving electrode 8 in the circuit breaker 100 to operate in the direction A through the operation of the moving element 23.

In addition, the linear motor 20 is electrically connected to a control cable 26, which includes a motor connection line and a cable of the position detecting device 29, through a sealing metal terminal 25 that is provided so as to establish wiring connection with a drive circuit 28 outside the actuator case 22 while maintaining the air sealing in the actuator case 22, and the control cable 26 is connected to the control unit 27 and is configured to transmit a position signal to the control unit 27. That is, the control unit 27 controls a voltage and a phase to be supplied to the linear motor 20 based on the contact state between the fixed arcing contact 5 and the moving arcing contact 9, which is detected by the conduction detecting device 37, and the position information of the moving element 23 of the linear motor 20, which is detected by the position detecting device 29, and the drive circuit 28 receives a drive signal from the control unit 27 and supplies the same voltage as that indicated by the drive signal to the linear motor 20. That is, the control unit 27 and the drive circuit 28 work as a control device for changing the amount of voltage and the phase to be supplied to the linear motor 20.

More specifically, the control unit 27 and the drive circuit 28 according to the embodiment vary the magnitude and the direction of thrust force acting on the moving element 23 of the linear motor 20 by controlling the voltage and the phase to be supplied to the linear motor 20 based on the contact state between the fixed arcing contact 5 and the moving arcing contact 9, which is detected by the conduction detecting device 37, and the position information of the moving element 23 of the linear motor 20, which is detected by the position detecting device 29, and set a moving range of the moving arcing contact 9 by controlling a drive speed and a stop position of the moving arcing contact 9.

Next, a description will be given of a structure of the linear motor 20 with reference to FIGS. 3 to 6. The linear motor 20 illustrated in FIGS. 3 to 6 is an example of a three-phase motion linear motor. In addition, the linear motor 20 is not limited to the three-phase motion, and another configuration such as two-phase motion or multiple-phase motion of four or more phases is also applicable.

As illustrated in the drawings, the linear motor 20 according to the embodiment is a linear motor in which a fixed element configured of three armatures 58, 59, and 60 and the moving element 23 formed by a plurality of permanent magnets 51 arranged in the advancing direction (direction Z) such that magnetization directions 55 of adjacent permanent magnets 51 are alternately oriented perform relative linear motion (horizontal movement). The three-phase linear motor can be configured by arranging the fixed element formed of the three armatures 58, 59, and 60 such that phases thereof electrically deviate by 1200, and an m-phase motion linear motor can be configured of m armatures in the same manner.

The plurality of permanent magnets 51 are fixedly attached to a member (not shown) that holds the permanent magnets 51, the plurality of permanent magnets 51 and the member that holds the permanent magnets 51 form the moving element 23, and the moving element 23 is coupled to the insulating rod 10. In addition, the moving element 23 and the fixed element are held by support means capable of performing relative linear motion. It is also possible to fix the moving element 23 and move the side of the fixed element (armatures).

One armature 58 is configured of first magnetic pole teeth 52 provided on the upper side so as to face the permanent magnets 51, second magnetic pole teeth 53 provided on the lower side so as to face the permanent magnets 51, and a magnetic body 54 that couples the first magnetic pole teeth 52 on the upper side and the second magnetic pole teeth 53 on the lower side and forms routes of magnetic fluxes, the armature 58 is formed such that the permanent magnets 51 are pinched between the first magnetic pole teeth 52 and the second magnetic pole teeth 53 in the vertical direction, and two first magnetic pole teeth 52 and two second magnetic pole teeth 53 are aligned in the advancing direction (direction Z) of the permanent magnets 51. A winding 50a and a winding 50*b* are arranged at each of the two aligned first magnetic pole teeth 52 and each of the two aligned second magnetic pole teeth 53 of the armature 58, respectively, and the first magnetic pole teeth 52 and the second magnetic pole teeth 53 are arranged at such positions to face the permanent magnets 51.

In addition, the armatures 59 and 60 have the same configuration.

Figure 5:
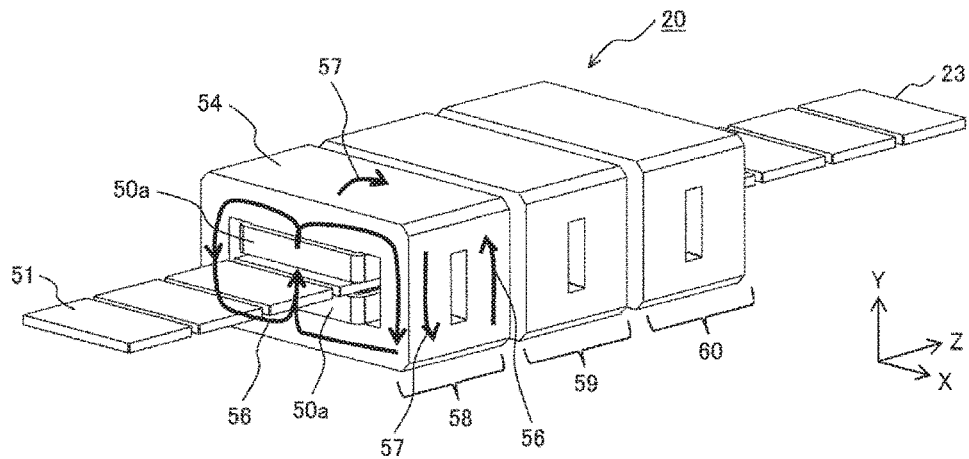
FIG. 5 is a diagram illustrating a route of a first magnetic flux and a route of a second magnetic flux of the linear motor that is employed in the gas circuit breaker according to the first embodiment of the switchgear of the invention and corresponding to FIG. 3.
Figure 6:
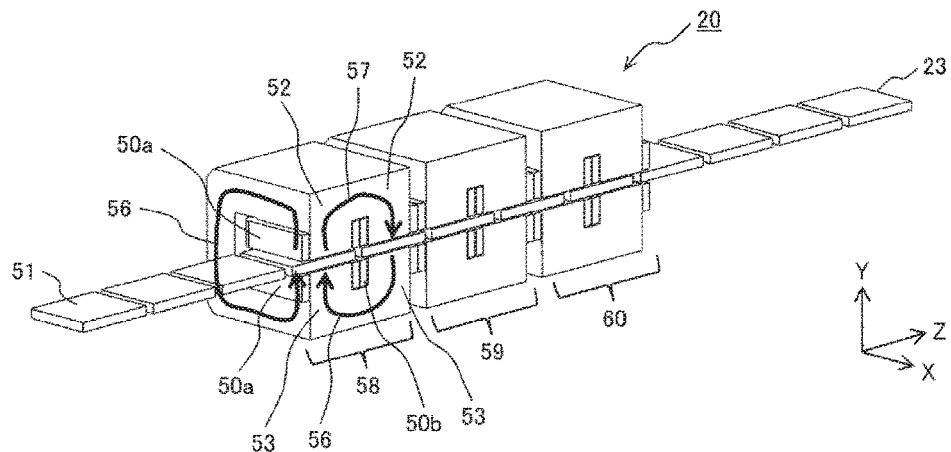
FIG. 6 is a diagram illustrating the route of the first magnetic flux and the route of the second magnetic flux of the linear motor that is employed in the gas circuit breaker according to the first embodiment of the switchgear of the invention and corresponding to FIG. 4.

FIGS. 5 and 6 illustrate directions of the magnetic fluxes created by the winding 50*a* and the winding 50*b* in a gap between the first magnetic pole teeth 52 and the second magnetic pole teeth 53 (the windings of the linear motor typically temporally change magnitude of a current and a direction of the current depending on positions of the permanent magnets; FIGS. 5 and 6 illustrate magnetic fluxes created in the gap by the current flowing through the windings 50*a* and 50*b* at specific timing).

As illustrated in the drawings, the winding 50*a* generates a magnetic flux 56 from the lower side to the upper side while the winding 50*b* generates a magnetic flux 57 from the upper side to the lower side.

Since the linear motor 20 described in the embodiment has a plurality of routes for magnetic fluxes generated by causing the current to flow through the winding 50*a* and the winding 50*b* and for magnetic fluxes of the permanent magnets 51 inside the fixed elements as illustrated in FIG. 6 and is driven without increasing a size of a drive device, it is possible to reduce the size of the linear motor 20. Moreover, it is possible to reduce suctioning force (force working in the direction Y in the drawing) generated in the permanent magnets 51 by employing a structure in which the permanent magnets 51 are pinched between the first magnetic pole teeth 52 and the second magnetic pole teeth 53.

Although the suctioning force (force in the direction Y) is typically generated among the permanent magnets 51, the first magnetic pole teeth 52, and the second magnetic pole teeth 53, the suctioning force is reduced due to suctioning force generated at the permanent magnets 51 and the first magnetic pole teeth 52 and suctioning force generated at the permanent magnets 51 and the second magnetic pole teeth 53 offsetting the force in the configuration according to the embodiment.

Therefore, since it is possible to simplify a mechanism for supporting the moving element 23 and to reduce a mass of the moving element 23, the structure is suitable for operations of the gas circuit breaker that requires high accelerated motion and highly-responsive motion. In addition, it is possible to reduce the mass of the moving element 23 and to thereby expect reduction in loads on the support member and the like, an improvement in reliability of the gas circuit breaker, and an improvement in a maintenance property.

In addition, since the moving element 23 with the permanent magnets 51 arranged in the direction in which the drive force of the linear motor 20 is generated and the linear motor 20 that has magnetic poles arranged so as to face the moving element 23 and including windings 50*a* and 50*b* are mounted on the gas circuit breaker in the embodiment, it is possible to reduce the weight of the moving element 23 and to improve reliability of the gas circuit breaker due to no need to provide a wiring in the moving element 23.

Although the case of using the permanent magnets 51 was described in the embodiment, a configuration is also applicable in which the magnetic body 54 instead of the permanent magnets 51 is arranged at the moving element 23. Here, the magnetic body 54 represents a member that receives the suctioning force from the permanent magnets 51, and representative examples of the member include iron and a silicon steel plate.

In a case in which the circuit breaker 100 and the operation unit 101 have different gas compartments as illustrated in FIGS. 1 and 2, the actuator case 22 of the operation unit 101 is sealed from the outside (atmospheric air) in some cases and is not sealed therefrom in other cases while the circuit breaker 100 is filled with high-air-pressure $SF_6$ gas. In a case of being sealed from the outside, the inside of the actuator case 22 is filled with dried air, nitrogen, or $SF_6$ gas at the atmospheric air pressure.

If the operation unit 101 is sealed, the operation unit 101 is less affected by an external environment, and it is possible to exclude factors of deteriorating performances, such as entrapping of moisture, rainwater, insects, and the like. Therefore, it is possible to provide an operation unit with high reliability.

However, it becomes difficult to inspect the inside if the operation unit 101 is sealed from the outside. Therefore, it becomes difficult to detect a factor of internal abnormality in a case in which a defect occurs in the operation unit 101 and to perform simple maintenance and inspection work of the inside. It is not necessary to seal the actuator case 22 if priority is placed on easiness of such an inspection of the inside.

Although the example in which the linear motor 20 is configured of three armatures 58, 59, and 60 was described in the embodiment, it is obvious that the number of the fixed elements is not limited to three.

The moving element 23 of the linear motor 20 in the aforementioned embodiment integrally operates with the moving electrode 8 of the circuit breaker 100 as described above, and stroke of the moving electrode 8 can be adjusted from the position of the moving element 23.

In the embodiment, a function of the control unit 27 is defined as outputting of the drive signal of the drive circuit 28 for controlling the linear motor 20 based on an opening or closing command from the upper level. The drive circuit 28 is configured of a switching element and an associated circuit thereof and supplies a voltage and a current from a power source, which is not shown in the drawing, to the linear motor 20 by receiving a drive signal from the control unit 27 and switching the internal element in accordance with the signal.

The position detector 29 has a linear scale attached to the moving element 23 of the linear motor 20, for example, and can deliver a position signal of the moving element 23 to the control unit 27 by reading a position of the linear scale with a sensor. The control unit 27 executes position control and motor control based on the position signal. Although not particularly illustrated in the drawing, the drive circuit 28 is provided with a motor current sensor and is configured such that a motor current value is delivered to the control unit 27.

Although the motor-related components are divided into the control unit 27, the drive circuit, and the linear motor 20 in the embodiment, such a device dividing configuration is not necessarily employed as long as the same operations and functions can be achieved.

Figure 7:
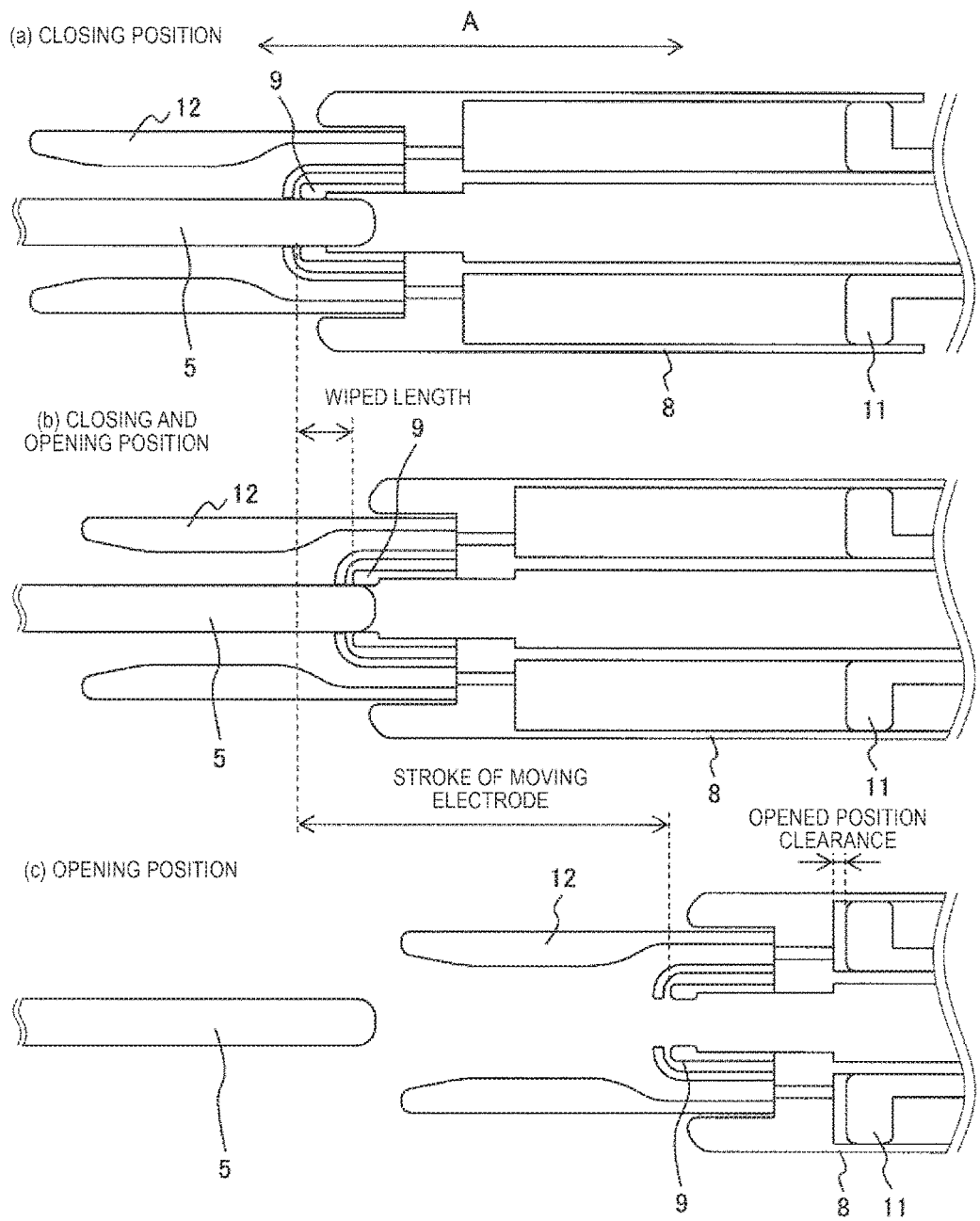
FIG. 7 illustrates exemplary position control for a moving arcing contact of the gas circuit breaker according to the first embodiment of the switchgear of the invention, (a) illustrates a closing position between a fixed arcing contact and the moving arcing contact of the circuit breaker, (b) illustrates closing and opening positions between the fixed arcing contact and the moving arcing contact, and (c) illustrates an opening position between the fixed arcing contact and the moving arcing contact.

FIG. 7 illustrates (a) a closing position between the fixed arcing contact 5 and the moving arcing contact 9, (b) closing and opening positions between the fixed arcing contact 5 and the moving arcing contact 9, and (c) an opening position between the fixed arcing contact 5 and the moving arcing contact 9 of the circuit breaker 100 according to the embodiment.

Since the positions of the fixed arcing contact 5 and the puffer piston 11 are fixed, the wiped length that is a moving amount until the fixed arcing contact 5 and the moving arcing contact 9 separate from the closing position and the opened position clearance that is remained displacement of the circuit breaker 100 in the puffer chamber at the opening position between the fixed arcing contact 5 and the moving arcing contact 9 are typically determined by positions and moving distances (hereinafter, referred to as stroke) of the moving electrode 8 (including the moving arcing contact 9) at the opening position (c), the closing and opening position (b), and the closing position (a).

Figure 8:
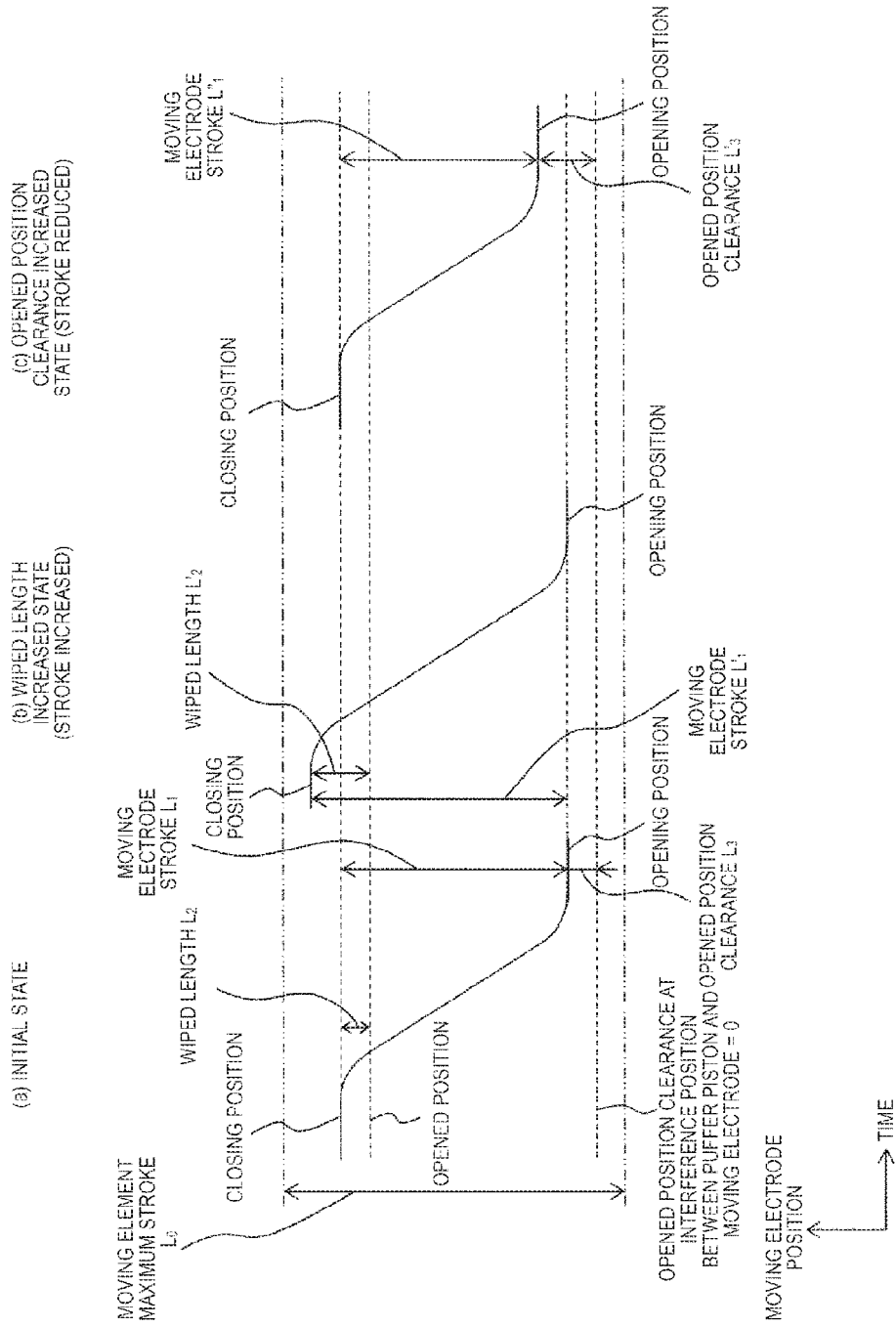
FIG. 8 illustrates an exemplary stroke curve when a wiped length and an opened position clearance are set by position control for the moving arcing contact of the gas circuit breaker according to the first embodiment of the switchgear of the invention, (a) illustrates an initial state in which no control is performed, (b) illustrates a state in which the wiped length is increased, and (c) illustrates a state in which the opened position clearance is increased.

FIG. 8 illustrates an exemplary stroke curve when a wiped length and an opened position clearance are set by the position control.

The drawing illustrates an initial state in which no control is performed (a), a state in which the wiped length is increased (b), and a state in which the opened position clearance is increased (c). The setting of the wiped length and the opened position clearance can be made when a relationship between the maximum stroke $L_0$ of the moving element 23 of the linear motor 20 and a stroke $L_1$ of the moving electrode satisfies $L_0 > L_1$.

It is possible to increase the wiped length if the closing position is moved toward the side of the fixed arcing contact 5 by increasing the stroke as illustrated in FIG. 8(*b*), and it is possible to increase the opened position clearance if the opening position is moved toward the side of the fixed arcing contact 5 by reducing the stroke as illustrated in FIG. 8(*c*), and vice versa. Therefore, it is possible to arbitrarily set the wiped length and the opened position clearance within the range of $L_0 > L_1$.

Figure 9:
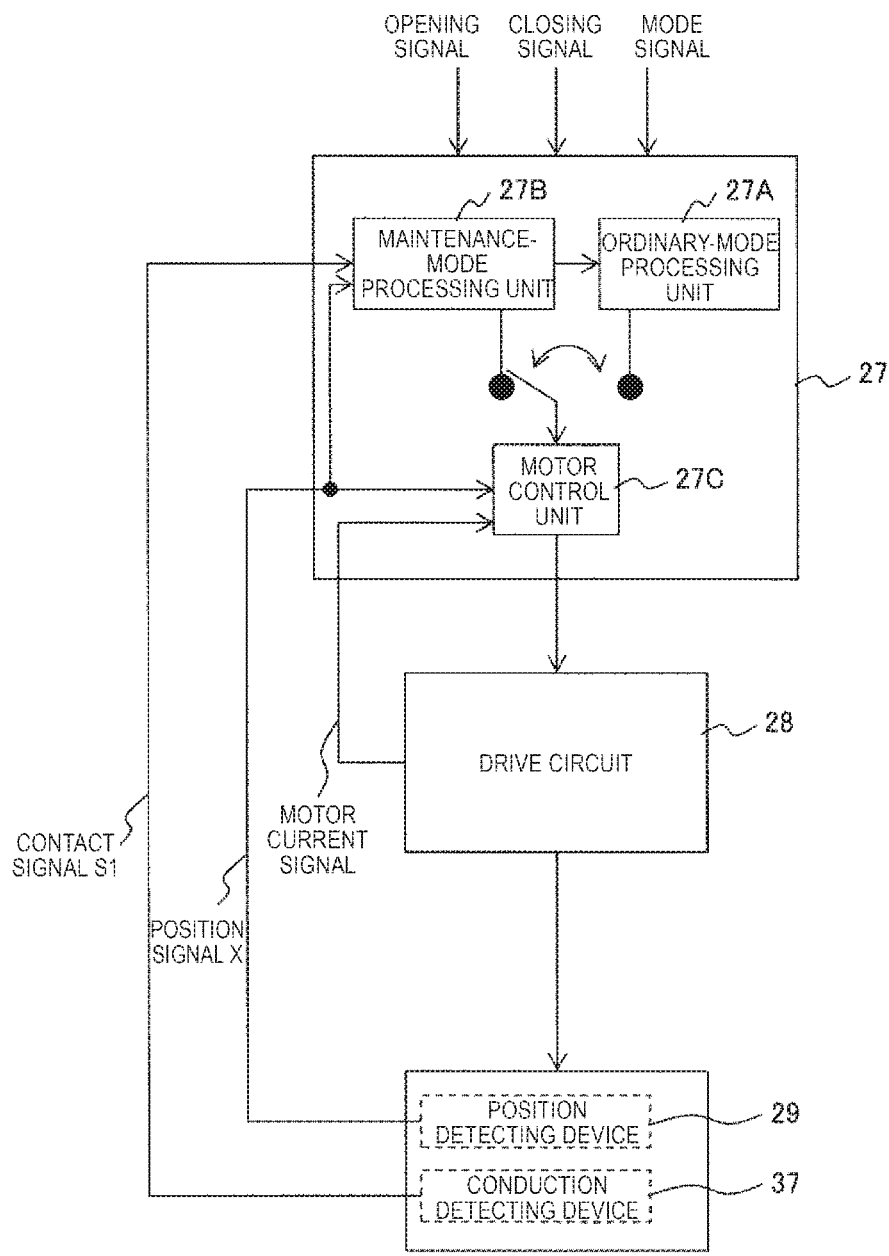
FIG. 9 is a diagram illustrating, in detail, a control unit and a drive circuit that are employed in the gas circuit breaker according to the first embodiment of the switchgear of the invention.

FIG. 9 illustrates details of the control unit 27 and the drive circuit 28 according to the embodiment.

As illustrated in the drawing, the opening signal and the closing signal from the upper level are input to the control unit 27, and also, a mode signal for selecting an ordinary mode for operations as a circuit breaker or a maintenance mode for setting the originally designed wiped length and the opened position clearance, which is a feature of the embodiment, is also input thereto. The mode signal may be input by a button switch provided in the main body of the control unit 27 or may be input as a communication signal through a communication line.

In addition, a position signal X is input to the control unit 27 from the position detecting device 29 associated with the linear motor 20, and also, a contact signal S1 is input thereto from the conduction detecting device 37 that is a contact detecting device installed in the circuit breaker 100.

The control unit 27 is configured of an ordinary-mode processing unit 27A, a maintenance-mode processing unit 27B, and a motor control unit 27C. The ordinary-mode processing unit 27A has functions of determining necessary operations based on the opening signal or the closing signal from the upper level and outputting an appropriate position command, a speed control value, and a q-axis current limit value to the motor control unit 27C. The q-axis current is calculated based on a motor current and a motor phase and is proportional to the motor thrust force. The motor phase is obtained by magnetic arrangement and the position signal X of the moving element 23 of the linear motor 20.

In contrast, the maintenance-mode processing unit 27B is a component that performs processing of adjusting a command of closing an active position $X_{MAKE}$ and a command of opening the active position $X_{BREAK}$ so as to set the wiped length and the opened position clearance to the preset values, based on the position signal X from the position detecting device 29 and the contact signal S1 from the conduction detecting device 37, and starts or stops the position control and outputs a position command, a speed limit value, and a q-axis current limit value to the motor control in accordance with the processing procedure. Detailed operations will be described later.

An input to the motor control unit 27C is selected from an input from the ordinary-mode processing unit 27A or an input from the maintenance-mode processing unit 27B in accordance with the mode signal. The motor control unit 27C obtains a q-axis current command value in proportional to the motor thrust force from a position control system, which is calculated based on various input signals, calculates a drive signal necessary for generating the q-axis current command value, and outputs the drive signal to the drive circuit 28.

In addition, the motor current signal from the drive circuit 28 and the position signal X from the position detecting device 29 installed in the linear motor 20 are input to the motor control unit 27C and are used for processing in the motor control unit 27C.

The drive circuit 28 generates a predetermined motor current by turning on and off the switching element based on the drive signal from the control unit 27 and applying a predetermined voltage to the linear motor 20. The thrust force is generated in the moving element 23 of the linear motor 20 by distributing the predetermined motor current to the linear motor 20, and the moving electrode 8 coupled to the moving element 23 performs linear motion. The thrust force generated in the moving element 23 of the linear motor 20 reflects an output of the position control from the motor control unit 27C. In the case in which the position command coincides with a current position, thrust force becomes zero as long as no external load is applied to the linear motor 20.

Figure 10:
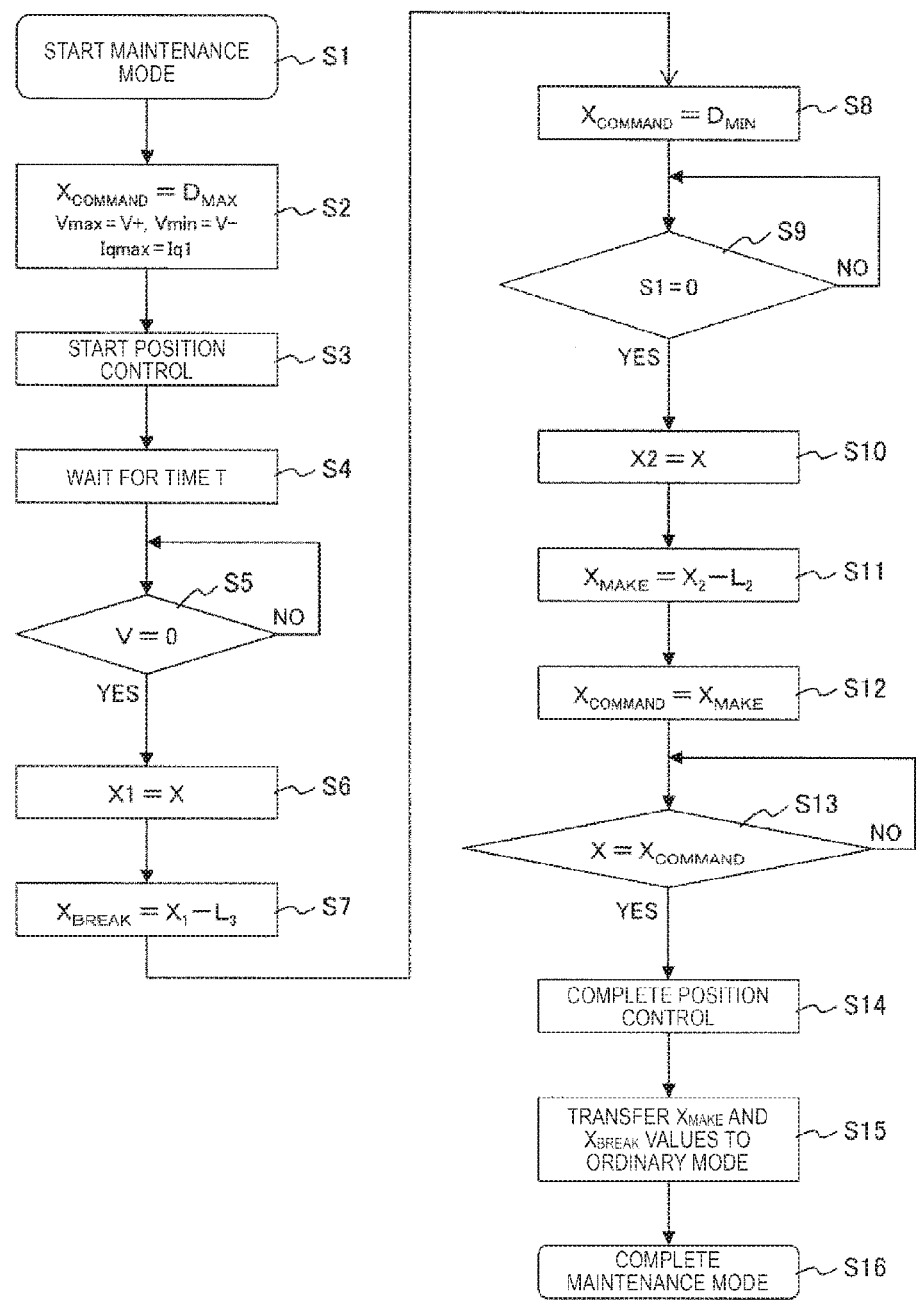
FIG. 10 is a flowchart of a procedure of maintenance-mode by the gas circuit breaker according to the first embodiment of the switchgear of the invention.
Figure 11:
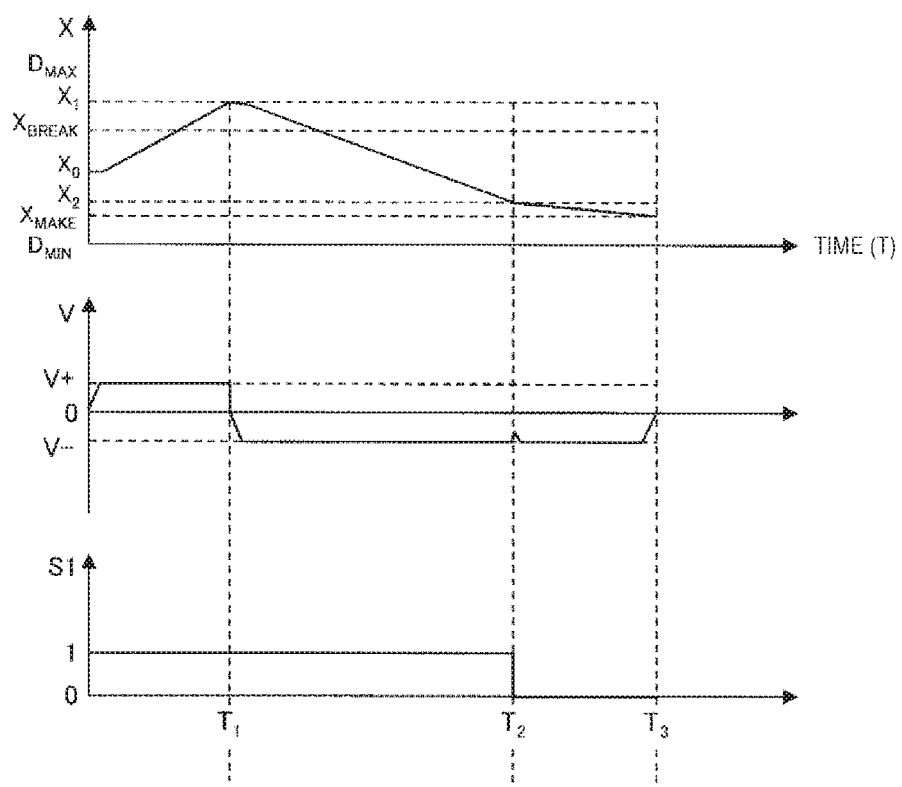
FIG. 11 is a timing chart of the position control for the moving arcing contact according to the first embodiment in the gas circuit breaker according to the first embodiment of the switchgear of the invention.

Next, a description will be given of operations of the maintenance-mode processing unit 27B, that is, a method of calculating a command of closing an active position and a command of opening an active position with reference to FIGS. 10 and 11.

First, a description will be given of an exemplary method of setting the originally designed wiped length and the opened position clearance, which is a feature of the embodiment.

The setting method described below is for calculating the command of opening the active position and the command of closing the active position for setting the originally designed opened position clearance and the wiped length.

It is assumed that in an initial state of the maintenance mode, the conduction detecting device 37 (contact signal circuit) is attached to the circuit breaker 100, the current position X of the moving element 23 of the linear motor 20 is around the center X0 of the stroke of the moving element 23, and the speed is zero in a time zero state.

The maintenance mode is input as the mode signal, and the maintenance-mode processing unit 27B of the control unit 27 starts the processing (S1). In the maintenance mode, the motor stroke maximum value $D_{MAX}$ is set in a position command $X_{COMMAND}$. Furthermore, speed limit values $V_{max}$ and $V_{min}$ are set to be values V+ and V− that are lower than an ordinary operating speed of the circuit breaker so as not to damage the moving electrode 8 even if the moving electrode 8 collides against the operation end in the maintenance mode. Moreover, the q-axis current limit value $I_{qmax}$ is also set to be a value $I_{q1}$ that is lower than a rated value of the motor current so as not to cause unnecessary thrust force in a state in which the motor is in a zero speed state (S2).

After prior conditions such as the position command are set, the command of starting the position control is set to time zero. The motor control unit 27C starts the calculation for the position control in response to the position control start command (S3) and calculates a drive signal command of the drive circuit 28 obtained from the thrust force with which the moving element 23 moves in a direction $D_{MAX}$. The thrust force is generated in the moving element 23 of the linear motor 20 and the moving element 23 starts to move in the direction $D_{MAX}$ by the drive circuit 28 supplying voltages and currents to the armatures 58, 59, and 60 of the linear motor 20 in response to the drive signal from the control unit 27 (the maintenance-mode processing unit 27B does not perform new processing in a period T in consideration of the configuration that the moving element 23 of the linear motor 20 accelerates from the speed zero (S4)). Then, the moving element 23 of the linear motor 20 gradually accelerates in the direction $D_{MAX}$ in accordance with the motor thrust force and moves at a constant speed at the speed limit value V+ as illustrated in FIG. 11.

Next, the maintenance-mode processing unit 27B waits until the speed V becomes zero again (S5). If the moving electrode 8 reaches a limit point in the opening direction at the time $T_1$ illustrated in FIG. 11 and the speed zero is detected, then the current position X is recorded as the opened position without clearance X1 (S6). The position command value $X_{BREAK}$ at the time of the opening operation is calculated as $X_{BREAK}$=X1–L3 based on the opened position without clearance X1 and a preset opened position clearance designed value L3 (S7). The position command value at the time of the opening operation for setting the originally designed opened position clearance can be calculated as described above.

Subsequently, the position command value $X_{COMMAND}$ is set to a motor stroke initial value $D_{MIN}$ in a closing direction (S8). In accordance with the command value, thrust force in the direction $D_{MIN}$ is generated in the moving element 23 of the linear motor 20, and the moving element 23 is accelerated to the speed limit value V–. At that time, the maintenance-mode processing unit 27B waits until the contact signal S1 that indicates whether or not the moving arcing contact 9 is in contact with the fixed arcing contact 5 changes from a state "1" that indicates no-contact to "0" that indicates contact (S9). The position X at time T2 when the signal S1 turns to "0" that indicates contact is recorded as the separation position X2 (S10). Furthermore, the preset wiped length L2 is used to calculate the command of closing the active position $X_{MAKE}$ as $X_{MAKE}$=X2–L2 (S11).

Next, the position command value $X_{COMMAND}$ is set to a command of closing the active position $X_{MAKE}$ (S12), and if the position X of the moving element 23 of the linear motor 20 coincides with the command value $X_{COMMAND}$ (S13), then the position control is completed (S14). After the completion of the position control, the position command value $X_{BREAK}$ at the time of the opening operation and the command value $X_{MAKE}$ at the time of the closing operation are delivered from the maintenance-mode processing unit 27B to the ordinary-mode processing unit 27A (S15), and the maintenance mode is completed (S16). Furthermore, the conduction detecting device 37 (contact signal circuit) and the wiring are removed to return to the ordinary mode and wait for the ordinary operation.

It is possible to automatically set the command of opening the active position and the command of closing the active position for maintaining the preset opened position clearance and the wiped length by performing the processing in the maintenance mode as described above. In addition, it is possible to maintain the originally designed performances of the circuit breaker by the ordinary-mode processing unit using the command of opening the active position and the command of closing the active position set in the maintenance mode.

The embodiment as described above has effects that the degree of freedom of the position of the moving arcing contact 9 in the circuit breaker 100 easily increases, that the dimension management of the components and the mechanism for adjusting the position of the moving arcing contact 9, which are required in the related art, are not required, and that simplification of component fabrication and device assembly and cost reduction can be achieved.

It is possible to set the originally designed wiped length and the opened position clearance and to thereby maintain the originally designed opening performance.

Although the procedure of calculating the command of opening the active position first and then calculating the command of closing the active position is employed in the aforementioned first embodiment, a procedure of calculating the command of closing the active position first may also be employed. Furthermore, it is also possible to complete the maintenance mode when the position of the moving element 23 of the linear motor 20, namely the position of the moving electrode 8 is at the position of the command of opening the active position or an arbitrary position instead of the position of the command of closing the active position.

Second Embodiment

Figure 12:
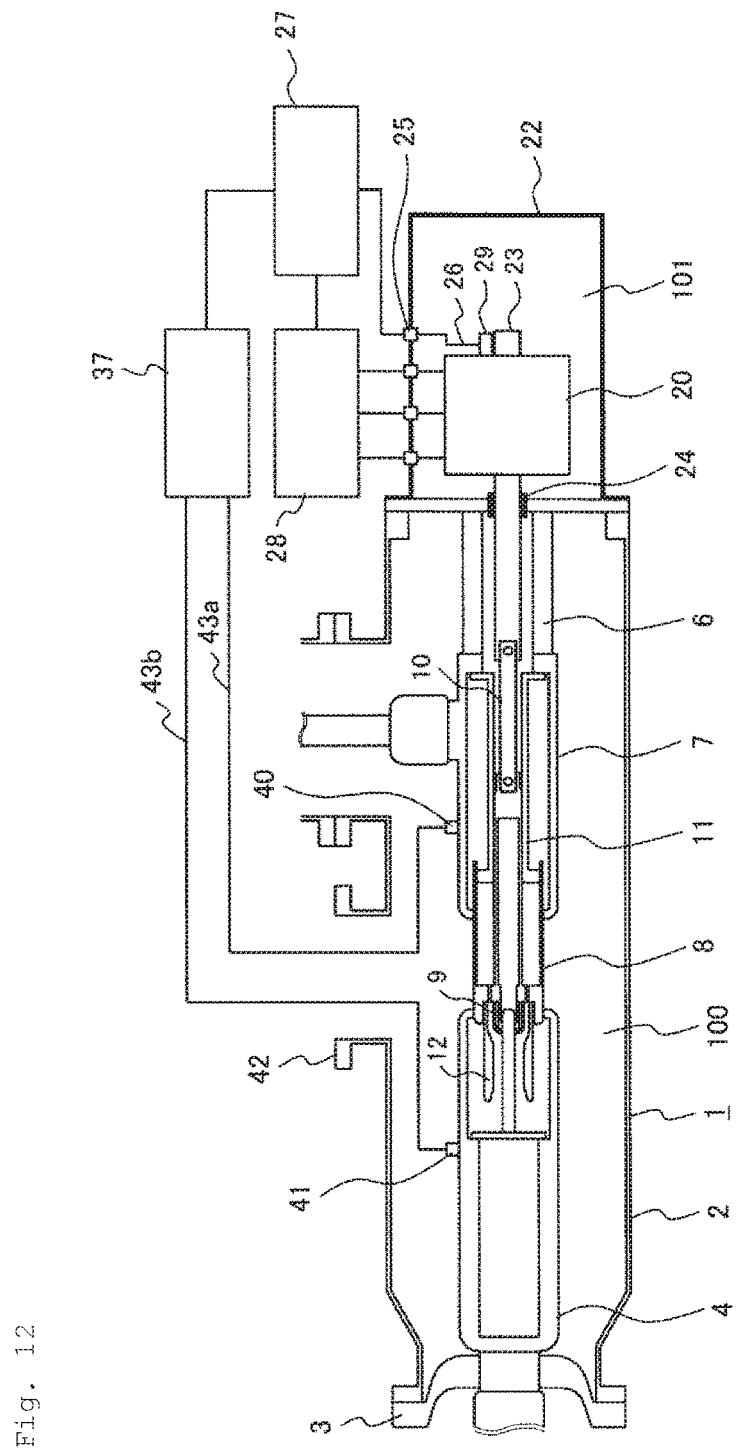
FIG. 12 is a sectional view illustrating a second embodiment of the switchgear of the invention and illustrating a closing position of a gas circuit breaker.

FIG. 12 illustrates a gas circuit breaker according to a second embodiment of the switchgear of the invention.

A gas circuit breaker 1 according to the embodiment as illustrated in the drawing includes a first conduction measurement terminal 40 provided at a moving-side conductor 7 and a second conduction measurement terminal 41 provided at the fixed-side conductor 4 as a contact detecting device that detects a contact state between a fixed arcing contact 5 and a moving arcing contact 9, and such a gas circuit breaker formed such that signal lines 43a and 43b connected to the first conduction measurement terminal 40 and the second conduction measurement terminal 41, respectively, are guided from a hand-hole 42 formed in a tank 2 and connected to a conduction detecting device 37 is used. The conduction detecting device 37 detects timing at which the fixed arcing contact 5 and the moving arcing contact 9 are brought into contact with or separated from each other, based on currents from the first conduction measurement terminal 40 and the second conduction measurement terminal 41, and the result is input to the control unit 27. The other configurations are the same as those in the first embodiment.

If such a configuration as in the embodiment is employed, the operations and the effects are the same as those in the first embodiment.

Third Embodiment

Figure 13:
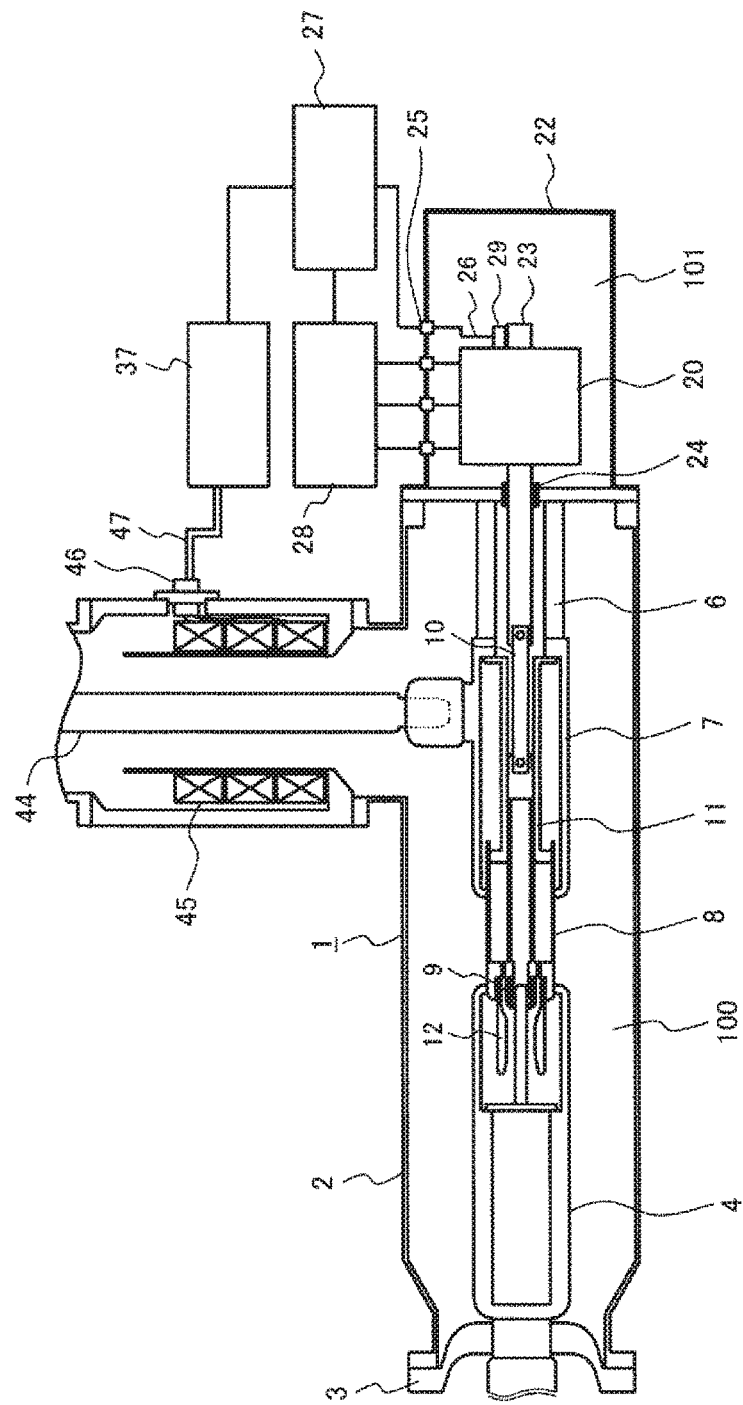
FIG. 13 is a sectional view illustrating a third embodiment of the switchgear of the invention and illustrating a closing position of a gas circuit breaker.

FIG. 13 illustrates a gas circuit breaker according to a third embodiment of the switchgear of the invention.

A gas circuit breaker 1 according to the embodiment as illustrated in the drawing includes, as a contact detecting device for detecting a contact state between a fixed arcing contact 5 and a moving arcing contact 9, a conduction measurement terminal (sealing metal terminal) 46 that is arranged in the periphery of a high-voltage conductor 44, which is connected to a moving-side conductor 7 and forms a part of a main circuit, and is provided at a secondary current generation unit of a current transformer 45 that detects a current at the high-voltage conductor 44, and such a gas circuit breaker in which the conduction measurement terminal 46 is connected to a conduction detecting device 37 via a signal line 47 is used. The conduction detecting device 37 detects timing at which the fixed arcing contact 5 and the moving arcing contact 9 are brought into contact with or separated from each other, based on a current from the conduction measurement terminal (sealing metal terminal) 46, and the result is input to the control unit 27. The other configurations are the same as those in the first embodiment.

If such a configuration as in the embodiment is employed, the operations and the effects are the same as those in the first embodiment.

Fourth Embodiment

Figure 14:
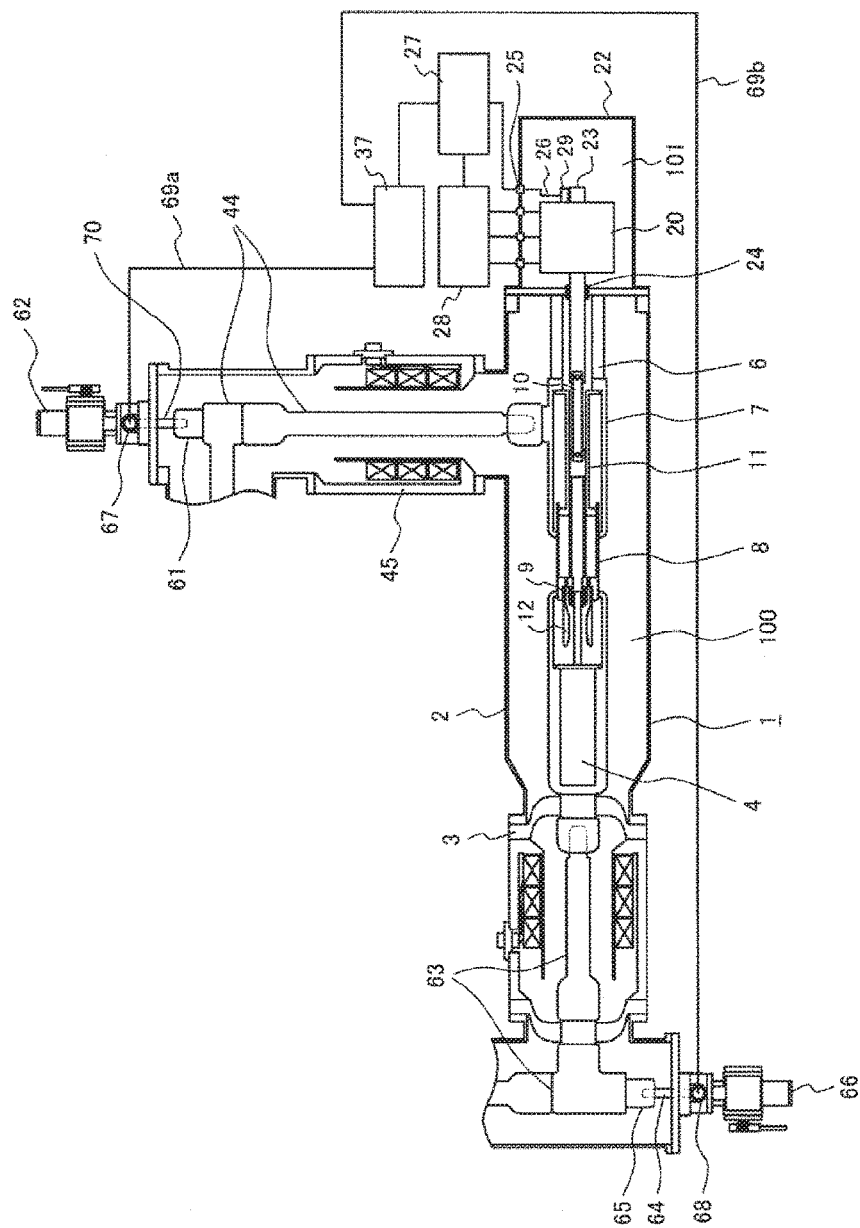
FIG. 14 is a sectional view illustrating a fourth embodiment of the switchgear of the invention and illustrating a closing position of a gas circuit breaker.

FIG. 14 illustrates a gas circuit breaker according to a fourth embodiment of the switchgear of the invention.

A gas circuit breaker 1 according to the embodiment as illustrated in the drawing includes a first grounding switch 62 that is connected to a current collector 61 via a moving element 60 so as to freely open and close in a high-voltage conductor 44 connected to a moving-side conductor 7 and forming a part of a main circuit and a second grounding switch 66 that is connected to a current collector 65 via a moving element 64 so as to freely open and close in a high-voltage conductor 63 connected to a fixed-side conductor 4 and forming a part of the main circuit, as a contact detecting device for detecting a contact state between a fixed arcing contact 5 and a moving arcing contact 9, and the gas circuit breaker 1 includes mega-ring terminals 67 and 68 that establish electric continuity with the moving elements 70 and 64 of the first grounding switch 62 and the second grounding switch 66, respectively. Such a gas circuit breaker in which the mega-ring terminals 67 and 68 are connected to the conduction detecting device 37 via signal lines 69a and 69b, respectively is used. The conduction detecting device 37 detects timing at which the fixed arcing contact 5 and the moving arcing contact 9 are brought into contact with or separated from each other based on currents from the respective mega-ring terminals 67 and 68, and the result is input to the control unit 27. The other configurations are the same as those in the first embodiment.

If such a configuration as in the embodiment is employed, the operations and the effects are the same as those in the first embodiment.

Fifth Embodiment

Figure 15:
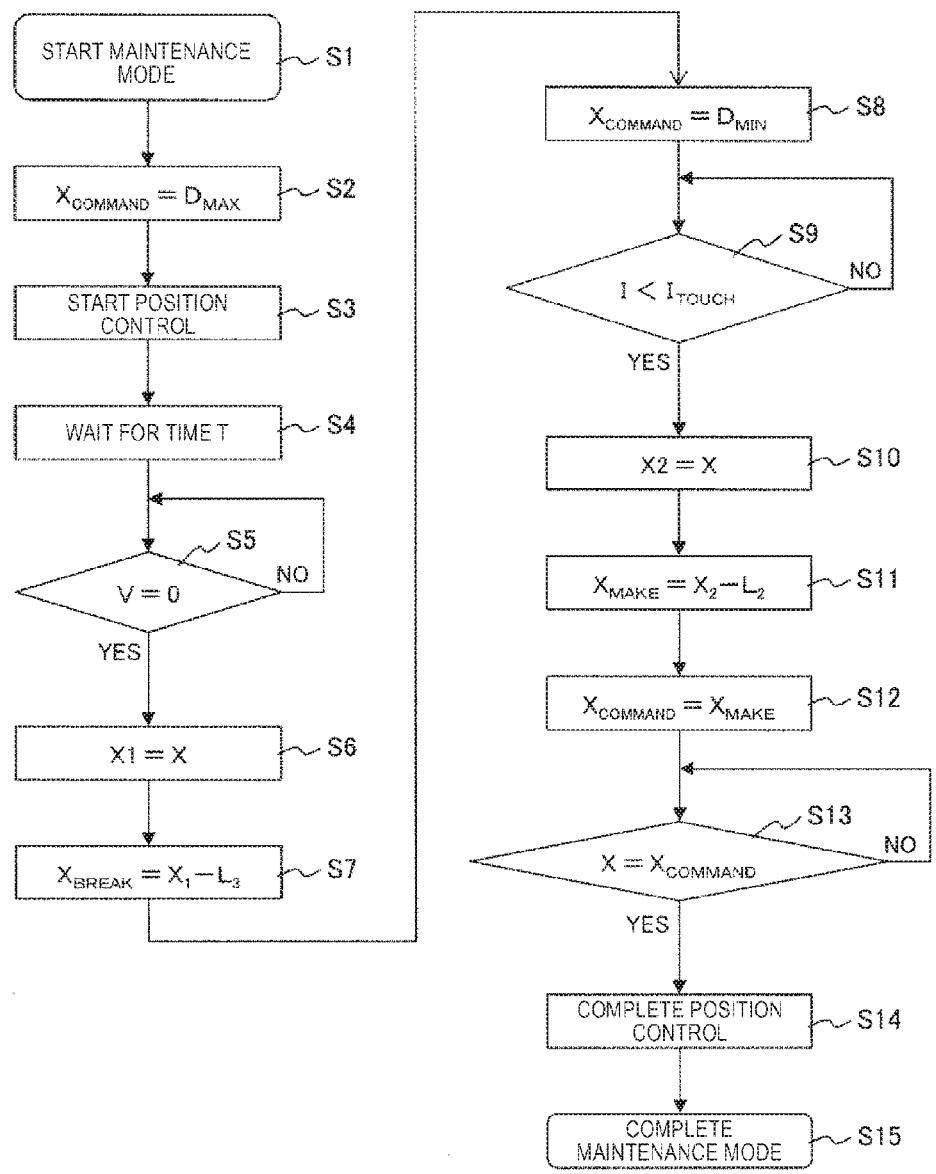
FIG. 15 is a flowchart of a procedure of maintenance-mode by a gas circuit breaker according to a fifth embodiment of the switchgear of the invention.
Figure 16:
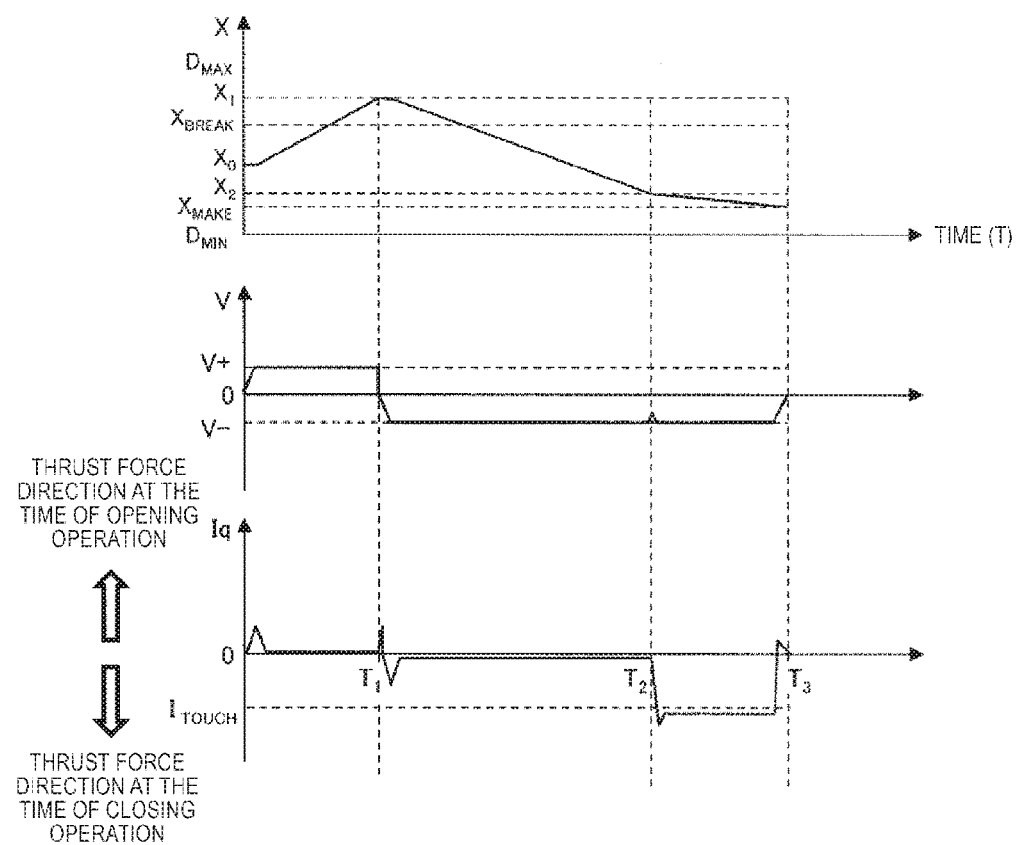
FIG. 16 is a timing chart of position control for the moving arching contact according to the first embodiment by the gas circuit breaker according to the fifth embodiment of the switchgear of the invention.

FIG. 15 illustrates a flowchart of a procedure of maintenance-mode according to a fifth embodiment of the invention. In addition, FIG. 16 illustrates a timing chart according to the fifth embodiment of the invention.

The embodiment is characterized by obtaining a command of closing an active position and a command of opening the active position that maintain the wiped length and the opened position clearance without any external contact signal circuit. That is, although calculating the command of opening the active position $X_{BREAK}$ and the starting the position control in the direction of the closing operation in the embodiment are the same as those in the first embodiment, it is determined, with a q-axis current value, how the moving arcing contact 9 and the fixed arcing contact 5 are brought into contact with each other at the time T2. That is, since frictional resistance increases as the moving arcing contact 9 enters the fixed arcing contact 5 and the q-axis current that is in proportion to thrust force also increases as the thrust force for maintaining the speed V− increases, it is possible to detect the contact between the moving arcing contact 9 and the fixed arcing contact 5 at T2 by providing a threshold value $I_{TOUCH}$ and making a comparison with the threshold value in Step 9 (S9) illustrated in FIG. 15. The other processing procedures are substantially the same as the processing procedures in the first embodiment as illustrated in FIG. 10 (However, if the position X of the moving element 23 of the linear motor 20 coincides the command value $X_{COMMAND}$ (S13), then the position control is completed (S14), and the maintenance mode is completed thereafter (S15) in the embodiment).

Here, it is desirable that the threshold value $I_{TOUCH}$ is set to a number that greatly deviates from the q-axis current value necessary for constantly operating the moving electrode 8 at the speed V− and has an absolute value that is slightly smaller than the q-axis current value necessary for operating the moving arcing contact 9 at the speed V− while causing friction with the fixed arcing contact 5.

It is possible to automatically set the command of opening the active position and the command of closing the active position that maintain the preset opened position clearance and the wiped length without any new contact signal circuit by employing the configuration according to the embodiment. In addition, it is possible to maintain the originally designed performances of the circuit breaker by the ordinary-mode processing unit 27A using the command of opening the active position and the command of closing the active position set in the maintenance mode.

Although the procedure of calculating the command of opening the active position first and then calculating the command of closing the active position is employed in the aforementioned embodiment, a procedure of calculating the command of closing the active position first may also be employed. Furthermore, it is also possible to complete the maintenance mode when the position of the moving element 23 of the linear motor 20, namely the position of the moving electrode 8 is at the position of the command of opening the active position or an arbitrary position instead of the position of the command of closing the active position.

The invention is not limited to the aforementioned embodiments, and various modification examples are included. For example, the aforementioned embodiments were described in detail for clearly explaining the invention, and the invention is not necessarily limited to inclusion of all the described configurations. In addition, a part of a configuration of a specific embodiment can be replaced with a configuration of another embodiment, and a configuration of another embodiment can be added to a configuration of a specific embodiment. Moreover, addition, deletion, or replacement of another configuration can be made for a part of a configuration of each embodiment.

REFERENCE SIGNS LIST

1: gas circuit breaker
2: tank
3: insulating spacer
4: fixed-side conductor
5: fixed arcing contact
6: insulating tube
7: moving-side conductor
8: moving electrode
9: moving arcing contact
10: insulating rod 11: puffer piston
12: nozzle
20: linear motor
22: actuator case
23: moving element of linear motor
24: gas-seal unit
25: sealing metal terminal
26: control cable
27: control unit
27A: ordinary-mode processing unit
27B: maintenance-mode processing unit
27C: motor control unit
28: drive circuit
29: position detecting device
34: test conductor
35, 40: first conduction measurement terminal
36, 41: second conduction measurement terminal
37: conduction detecting device
42: hand-hole
43a, 43b, 47, 69a, 69b: signal line
44, 63: high-voltage conductor
45: current transformer
46: conduction measurement terminal
50a, 50b: winding
51: permanent magnet
52: first magnetic pole teeth
53: second magnetic pole teeth
54: magnetic body
55: magnetization direction
56: magnetic flux from lower side to upper side
57: magnetic flux from upper side to lower side
58, 59, 60: armature
61, 65: current collector
62: first grounding switch
64, 70: moving element
66: second grounding switch
67, 68: mega-ring terminal
100: circuit breaker
101: operation unit

The invention claimed is:

1. A switchgear comprising: a circuit breaker that is configured of a fixed arcing contact installed at a fixed-side conductor and a moving arcing contact installed at a moving electrode that opens and closes with respect to the fixed arcing contact; a linear motor that generates drive force for operating the moving arcing contact; a position detecting device that detects a position of a moving element of the linear motor; a contact detecting device that detects a contact state between the fixed arcing contact and the moving arcing contact; and a control device that sets a moving range of the moving arcing contact by controlling a voltage and/or a phase to be supplied to the linear motor based on the contact state between the fixed arcing contact and the moving arcing contact, which is detected by the contact detecting device, and position information of the moving element of the linear motor, which is detected by the position detecting device.

2. The switchgear according to claim 1, wherein the moving range of the moving arcing contact is a wiped length that is a moving amount until the fixed arcing contact and the moving arcing contact open from a closing position and an opened position clearance that is remained displacement of the circuit breaker in a puffer chamber at an opening position between the fixed arcing contact and the moving arcing contact.

3. The switchgear according to claim 2, wherein the control device is configured of a control unit that controls the voltage and/or the phase to be supplied to the linear motor based on the contact state between the fixed arcing contact and the moving arcing contact, which is detected by the contact detecting device, and the position information of the moving element of the linear motor, which is detected by the position detecting device, and a drive circuit that receives a drive signal from the control unit and supplies the same voltage as that indicated by the drive signal to the linear motor.

4. The switchgear according to claim 3, wherein the control unit is configured of an ordinary-mode processing unit, a maintenance-mode processing unit, and a motor control unit, wherein the ordinary-mode processing unit has a function of determining a necessary operation for the circuit breaker based on an opening signal and a closing signal sent from an upper level and outputting a position command, a speed control value, and a q-axis current limit value to the motor control unit, wherein the maintenance-mode processing unit has a function of adjusting a command of closing an active position and a command of opening the active position so as to set the wiped length and the opened position clearance to be preset values based on a position signal of the moving element of the linear motor, which is obtained by the position detecting device, and a contact state signal between the fixed arcing contact and the moving arcing contact, which is obtained by the contact detecting device, and wherein the motor control unit has a function of obtaining a q-axis current command value in proportion to the thrust force of the linear motor calculated based on the position signal, the contact state signal, and an input signal from the maintenance-mode processing unit or the ordinary-mode processing unit, calculating a drive signal necessary for generating the q-axis current command value, and outputting the drive signal to the drive circuit.

5. The switchgear according to any one of claim 1, wherein the position detecting device that detects the position of the moving element of the linear motor is configured of a linear scale attached to the moving element and a sensor that reads a position of the linear scale.

6. The switchgear according to any one of claim 1, wherein the contact detecting device that detects a contact state between the fixed arcing contact and the moving arcing contact has a test conductor attached to a moving-side conductor that supports the moving electrode, includes a first conduction measurement terminal provided at the test conductor and a second conduction measurement terminal provided on a side of an insulating spacer of the fixed-side conductor, and is configured of a conduction detecting device that detects timing at which the fixed arcing contact and the moving arcing contact are brought into contact with or separated from each other, based on currents from the first and second conduction measurement terminals.

7. The switchgear according to any one of claim 1, wherein the contact detecting device that detects a contact state between the fixed arcing contact and the moving arcing contact includes a first conduction measurement terminal provided at a moving-side conductor that supports the moving electrode and a second conduction measurement terminal provided at the fixed-side conductor and is configured of a conduction detecting device that detects timing at which the fixed arcing contact and the moving arcing contact are brought into contact with or separated from each other, based on currents from the first and second conduction measurement terminals.

8. The switchgear according to any one of claim 1, wherein the contact detecting device that detects a contact state between the fixed arcing contact and the moving arcing contact includes a conduction measurement terminal that is provided at a secondary current generation unit of a current transformer that is arranged in a periphery of a high-voltage conductor connected to a moving-side conductor that supports the moving electrode and forming a part of a main circuit and detects a current at the high-voltage conductor, and the contact detecting device is configured of a conduction detecting device that detects timing at which the fixed arcing contact and the moving arcing contact are brought into contact with or separated from each other, based on a current from the conduction measurement terminal.

9. The switchgear according to any one of claim 1, wherein the contact detecting device that detects a contact state between the fixed arcing contact and the moving arcing contact includes a first grounding switch that is connected to a high-voltage conductor connected to a moving-side conductor that supports the moving electrode and forming a part of a main circuit via a moving element so as to be able to freely open and close, a second grounding switch that is connected to a high-voltage conductor connected to the fixed-side conductor and forming a part of the main circuit via a moving element so as to be able to freely open and close, and a mega-ring terminal that establishes electric continuity with the respective moving elements of the first and second grounding switches, and the contact detecting device is configured of a conduction detecting device that detects timing at which the fixed arcing contact and the moving arcing contact are brought into contact with or separated from each other, based on a current from the mega-ring terminal.

10. The switchgear according to any one of claim 1, wherein the contact detecting device that detects a contact state between the fixed arcing contact and the moving arcing contact detects the contact state between both the arcing contacts based on contact information depending on variations in a q-axis current.

11. The switchgear according to any one of claim 1, wherein the linear motor includes a moving element that is formed by aligning a plurality of permanent magnets or magnetic materials while inverting magnetizing directions and an armature that is configured of first magnetic pole teeth and second magnetic pole teeth arranged so as to pinch the permanent magnets or the magnetic materials in a vertical direction, a magnetic body that connects the first magnetic pole teeth with the second magnetic pole teeth and forms routes of magnetic fluxes, and windings that are respectively arranged at the first magnetic pole teeth and the second magnetic pole teeth.

12. The switchgear according to claim 11, wherein at least two first magnetic pole teeth and at least two second magnetic pole teeth are aligned in an advancing direction of the moving element or the armature, both the first magnetic pole teeth and the second magnetic pole teeth are coupled with the magnetic body, and at least two different magnetic paths through which the magnetic fluxes from the windings pass are formed.

13. The switchgear according to any one of claim 1, wherein the circuit breaker is accommodated in a tank, wherein the linear motor is arranged in a case that is arranged so as to be adjacent to the tank, and wherein the moving element of the linear motor is connected to the moving arcing contact in the tank via an insulating rod.

14. A switchgear comprising: a circuit breaker that is configured of a fixed arcing contact installed at a fixed-side conductor and a moving arcing contact installed at a moving electrode that opens and closes with respect to the fixed arcing contact; a linear motor that generates drive force for operating the moving arcing contact; a position detecting device that detects a position of a moving element of the linear motor; a contact detecting device that detects a contact state between the fixed arcing contact and the moving arcing contact; and a control device that changes a magnitude and/or a direction of thrust force acting on the moving element of the linear motor by controlling a voltage and/or a phase to be supplied to the linear motor and that sets a moving range of the moving arcing contact by controlling a drive speed and a stop position of the moving arcing contact based on the contact state between the fixed arcing contact and the moving arcing contact, which is detected by the contact detecting device, and position information of the moving element of the linear motor, which is detected by the position detecting device.

* * * * *